United States Patent [19]
Riley et al.

[11] Patent Number: 6,086,071
[45] Date of Patent: Jul. 11, 2000

[54] ADJUSTABLE SUSPENSION SYSTEM FOR A MOTOR VEHICLE

[75] Inventors: Robert Riley, Indianapolis; Ronald McMahon, Jamestown; Carl Seaberg, Indianapolis, all of Ind.

[73] Assignee: Chrysler Corporation, Auburn Hills, Mich.

[21] Appl. No.: 09/154,379

[22] Filed: Sep. 16, 1998

Related U.S. Application Data

[60] Provisional application No. 60/070,359, Jan. 2, 1998.

[51] Int. Cl.⁷ .................................................... B60G 17/00
[52] U.S. Cl. ..................................... 280/6.157; 280/5.521
[58] Field of Search ............................... 280/6.15, 6.151, 280/6, 157, 5.521

[56] References Cited

U.S. PATENT DOCUMENTS

| | | | |
|---|---|---|---|
| 2,249,356 | 7/1941 | Goodman | 280/6.157 |
| 4,958,584 | 9/1990 | Williamson | 280/6.157 |
| 5,530,648 | 6/1996 | Lavey | 364/424.05 |
| 5,553,836 | 9/1996 | Ericson | 267/286 |
| 5,671,964 | 9/1997 | DeRees et al. | 296/65.1 |

Primary Examiner—Kenneth R. Rice
Attorney, Agent, or Firm—Mark P. Calcaterra

[57] ABSTRACT

An adjustable suspension system for a motor vehicle is operative in a first mode or on-road mode and a second mode or off-road mode. The vehicle ride height in the second mode is significantly greater than that in the first mode. The adjustable suspension system includes first and second control arms pivotally interconnecting a wheel of the motor vehicle with the frame. A shock absorber has a first end fixedly interconnected to one of the control arms and a second end adjustably interconnected to the frame. A connector member is pivotally attached to the frame and has a first end attached to the shock absorber. A second end of the connector member is attached to a drive unit which rotates the connector member about a transverse pivot axis and thereby functions to establish the first and second modes.

21 Claims, 13 Drawing Sheets

ADJUSTABLE SUSPENSION SYSTEM FOR A MOTOR VEHICLE

CROSS-REFERENCE TO RELATED APPLICATION

This application is based on provisional patent application which has been assigned U.S. Ser. No. 60/070,359 (filed Jan. 2, 1998).

BACKGROUND OF THE INVENTION

1. Technical Field

The present invention generally relates to motor vehicles. More particularly, the present invention relates to an adjustable aerodynamic system for a motor vehicle.

2. Discussion

Vehicle ride height refers to a nominal vertical distance between the chassis and the ground. Modern vehicles are designed to operate at a specific ride height. The specific ride height chosen for a vehicle depends on the anticipated driving conditions. For example, sport cars are designed for on-road driving conditions and have a relatively low ride height. At the other end of the spectrum, off-road vehicles are designed to withstand rugged terrain and have a much greater ride height to provide clearance over normally encountered obstacles.

It is known in the art to equip a motor vehicle with height adjustable suspension units which can adjust the actual ride height. Most commonly, known arrangements are adapted to adjust the actual ride height to maintain the design ride height under varying loads. For example, vehicles used to haul cargo typically incorporate pneumatic shock absorbers for controlling the actual ride height of the vehicle. The pneumatic shock absorbers are interpositioned between the frame and the body of the vehicle and are pressurized by gas such as air. When pressurized, the length of the pneumatic shock increases and thereby adjusts the relative position of the vehicle body with respect to the ground.

When a user of a pneumatic shock absorber applies a heavy load to the cargo carrying area of the vehicle, the vehicle body typically sinks onto the frame due to the weight of the load and the compression of existing springs and shocks. The user simply injects a quantity of pressured air to increase the length of the pneumatic shock and enable the vehicle body to be raised, thereby overcoming the downward force associated with the load. In this manner, the vehicle may be leveled at the intended ride height despite the load it carries. While adjustable suspension systems which are load responsive have proven to be acceptable for their intended applications, they are all associated with disadvantages. In this regard, known systems are typically not designed to switch between low and high ride heights depending on encountered terrain. Additionally, most known systems do not retain constant shock absorber travel throughout a range of adjustability and thereby sacrifice performance. Furthermore, known systems typically require wheel angle adjustments referred to as camber adjustments to accommodate ride height changes.

To a more limited extent, it is known to provide an adjustable suspension for a motor vehicle adapted to selectively accommodate various driving conditions. While such known arrangements have proven to be acceptable for certain applications, they are all associated with limitations. For example, known suspensions require independent camber adjustments. In this regard, when the ride height is adjusted, independent adjustments are required to appropriately angle the wheels. Thus, it is desirable to provide an adjustable suspension which does not require this type of independent camber adjustment.

SUMMARY OF THE INVENTION

It is a general object of the present invention to provide an adjustable suspension system for a motor vehicle which overcomes the above-stated and other drawbacks associated with known vehicle suspension systems.

It is another object of the present invention to provide an adjustable suspension system for a motor vehicle selectively operable in an on-road mode and an off-road mode which does not require independent camber adjustment.

It is another object of the present invention to provide an adjustable suspension system for a motor vehicle operable to adjust vehicle ride height without affecting the range of shock absorber travel.

It is a more specific object of the present invention to provide an adjustable suspension system for a motor vehicle with improved control arm geometry configured to provide for optimum roll centers, camber curves and toe curves throughout a full range of total vertical travel.

In one form, the present invention provides an adjustable suspension for a motor vehicle having a frame and front and rear pairs of wheels. The adjustable suspension includes first and second control arms and a shock absorber. The first and second control arms both function to pivotally interconnect the wheel and the frame. The shock absorber has a first end fixedly interconnected to the second control arm and a second end adjustably interconnected to the frame. The adjustable suspension is selectively operable in a first mode to provide a first vehicle ride height and a second mode to provide a second substantially greater vehicle ride height.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
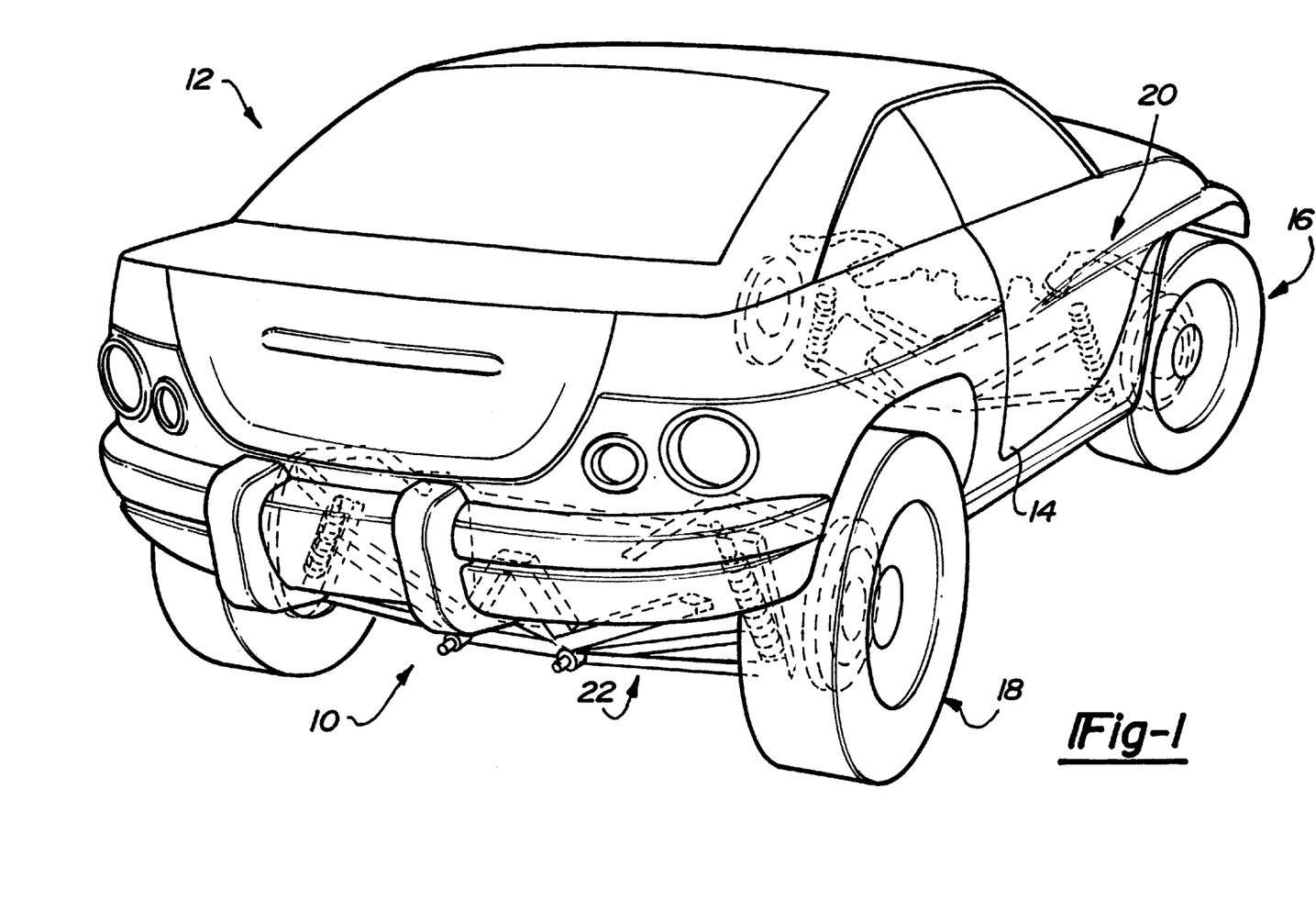
FIG. 1 is a perspective view of an adjustable suspension system constructed in accordance with the teachings of a preferred embodiment of the present invention shown operatively associated with an exemplary motor vehicle.
Figure 2:
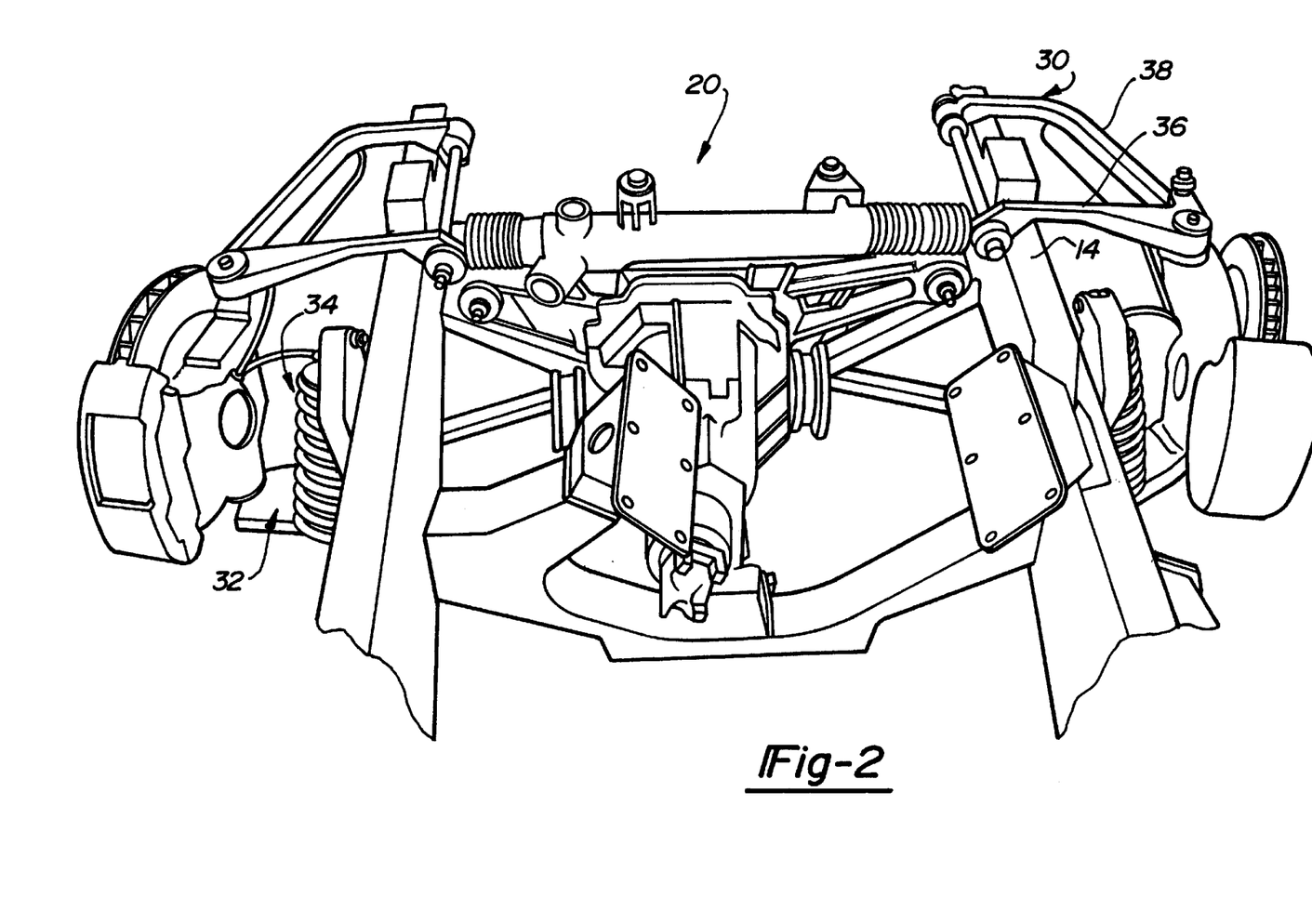
FIG. 2 is a top perspective view of the front end module of the adjustable suspension system of FIG. 1.
Figure 3:
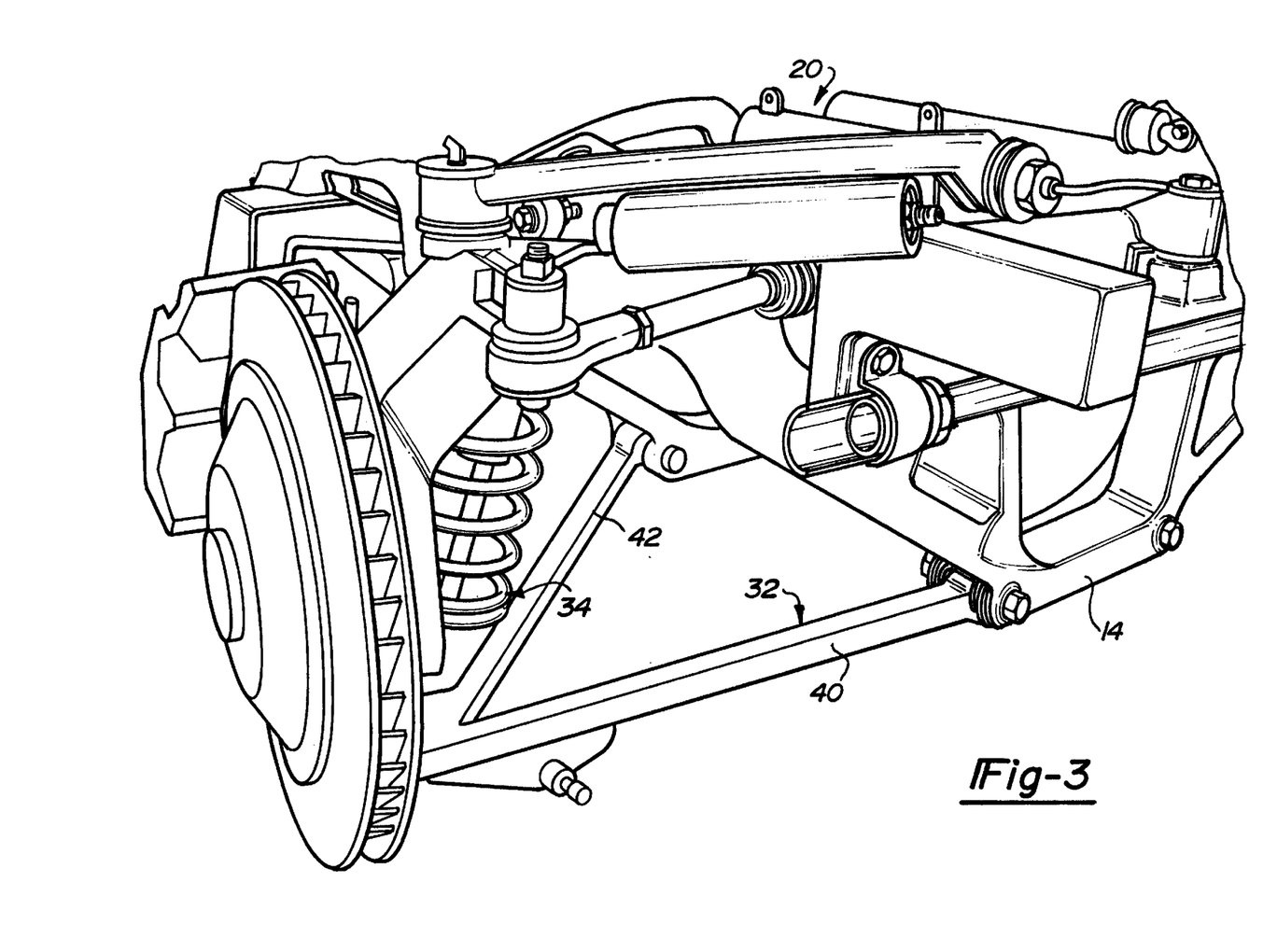
FIGS. 3–7 are enlarged views of portions of the front end module of FIG. 2.
Figure 4:
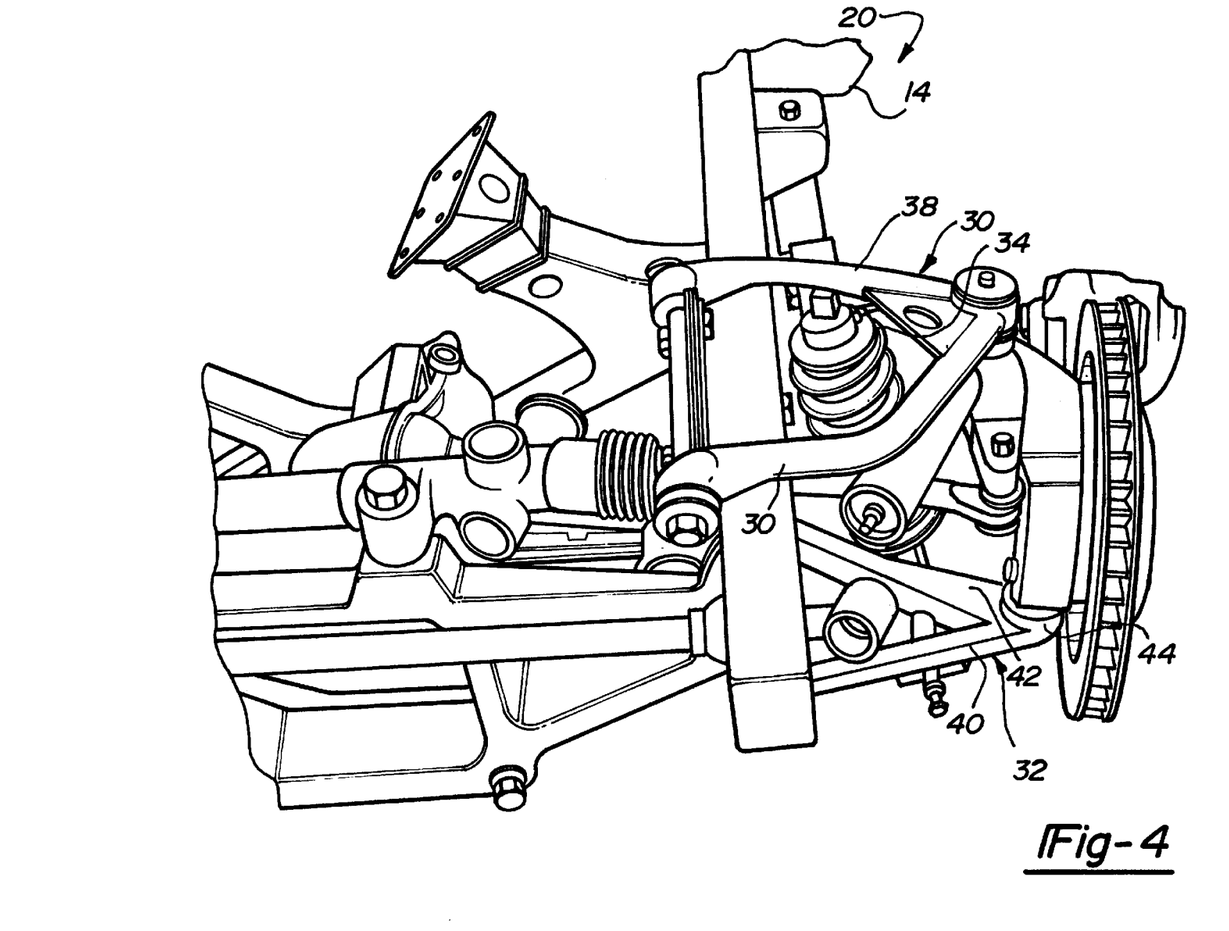

With initial reference to FIG. 1, an adjustable suspension system constructed in accordance with the teachings of a preferred embodiment of the present invention is generally identified with reference numeral 10. The adjustable suspension system 10 is shown operatively installed within an exemplary motor vehicle 12. Apart from the adjustable suspension 10, the exemplary motor vehicle 12 is conventional in nature. As such, the remainder of the vehicle 12 need not be described herein. It will be appreciated by those skilled in the art that the adjustable suspension system 10 of the present invention may be incorporated into a wide range of motor vehicles, and that the exemplary vehicle 12 is shown for illustrative purposes only. As will become apparent below, the adjustable suspension system 10 of the present invention is operative in a first mode or on-road mode to provide a first vehicle ride height and a second mode or off-road mode to provide a second substantially greater vehicle ride height.

With continued reference to FIG. 1, the exemplary motor vehicle is shown to include a frame 14 and front and rear pairs of wheels 16 and 18. In the exemplary embodiment, the motor vehicle 12 is a four wheel drive vehicle. The adjustable suspension system 10 is shown to generally include a front end module 20 operatively associated with the front pair of wheels 16 and a rear end module 22 operatively associated with the rear pair of wheels 18.

With continued reference to FIG. 1 and additional reference to FIGS. 2 through 7, the front end module 20 of the adjustable suspension system 10 will be described. The front end module 20 is a substantial mere image about a longitudinal centerline of the motor vehicle 12. In this regard, it will be understood that the components of the front end module 20 associated with a right wheel of the front pair of wheels 16 is substantially identical to components associated with the left wheel. Thus, as FIGS. 2–7 are described in detail, reference will be interchangeably made to the left and right hand sides of the front end module 20 for purposes of describing the common structure.

Each lateral side of the front end module 20 is shown to generally include a first or upper control arm 30 and a second or lower control arm 32. The rear end module 20 further generally includes a shock absorber 34 associated with each of the wheels 16. As illustrated, the upper control arm 30 pivotally interconnects the associated wheel with the frame 14. The upper control arm 30 includes first and second segments 36 and 38 pivotally attached in a largely conventional manner to the frame 14 at spaced apart points. The upper control arm 30 is adapted for pivotal movement about a longitudinally extending pivot axis. The first and second segments 36 and 38 converge at their second ends whereat the upper control arm 30 is rotatably interconnected to the wheels in a largely conventional manner for movement about a substantially vertical axis.

The lower control arm 32 is similarly shown to include first and second segments 40 and 42 pivotally attached to the frame 14 at spaced apart points. Again, the lower control arm 32 is adapted for pivotal movement about a longitudinally extending pivot axis. The first and second segments 40 and 42 of the lower control arm 32 converge at a common point 44 whereat they are rotatably attached to the wheel. Again, the permitted rotation is about a substantially vertical axis.

In the exemplary embodiment, the lower control arm 32 is substantially longer in length than the upper control arm 30. When the adjustable suspension system 10 of the present invention adjusts the vehicle ride height in a manner which will be discussed below, the differing lengths of the upper and lower control arms 30 and 32, operate to maintain proper camber of the associated wheel. The specific lengths of the control arms 30 and 32 will be specific to a particular application and determinable through limited experimentation.

The shock absorber 34 is shown to include a first end or lower end 48 fixedly interconnected to the lower control arm 32 in a largely conventional manner. The shock absorber 34 further includes an upper end 50 adjustably interconnected with the frame 14 of the vehicle 12 for movement between a first position when the adjustable suspension system 10 is in the first mode and a second position when the adjustable suspension system 10 is in the second mode. The particular manner in which the upper end 50 of the shock absorber 34 is adjustably interconnected to the frame 14 will be described immediately below.

The front end module 20 of the adjustable suspension system 10 of the present invention is further shown to include a connector member 52 operably associated with both of the wheels 16. The connector member 52 is pivotally attached to the frame 14 for pivotal movement about a transversely extending pivot axis. A first end 54 of the connector member 52 is attached to the upper end 54 of the shock absorber 34.

The adjustable suspension system 10 of the present invention further includes a drive unit 56 associated with each of the connector members 52. The drive unit 56 is shown to preferably include a linear actuator 58 interconnected to a second end 60 of the connector member 52. The linear actuator 58 is movable to an extended position for establishing the first mode of the adjustable suspension system 10 and a retracted position for establishing the second mode of the adjustable suspension system 10.

Figure 5:
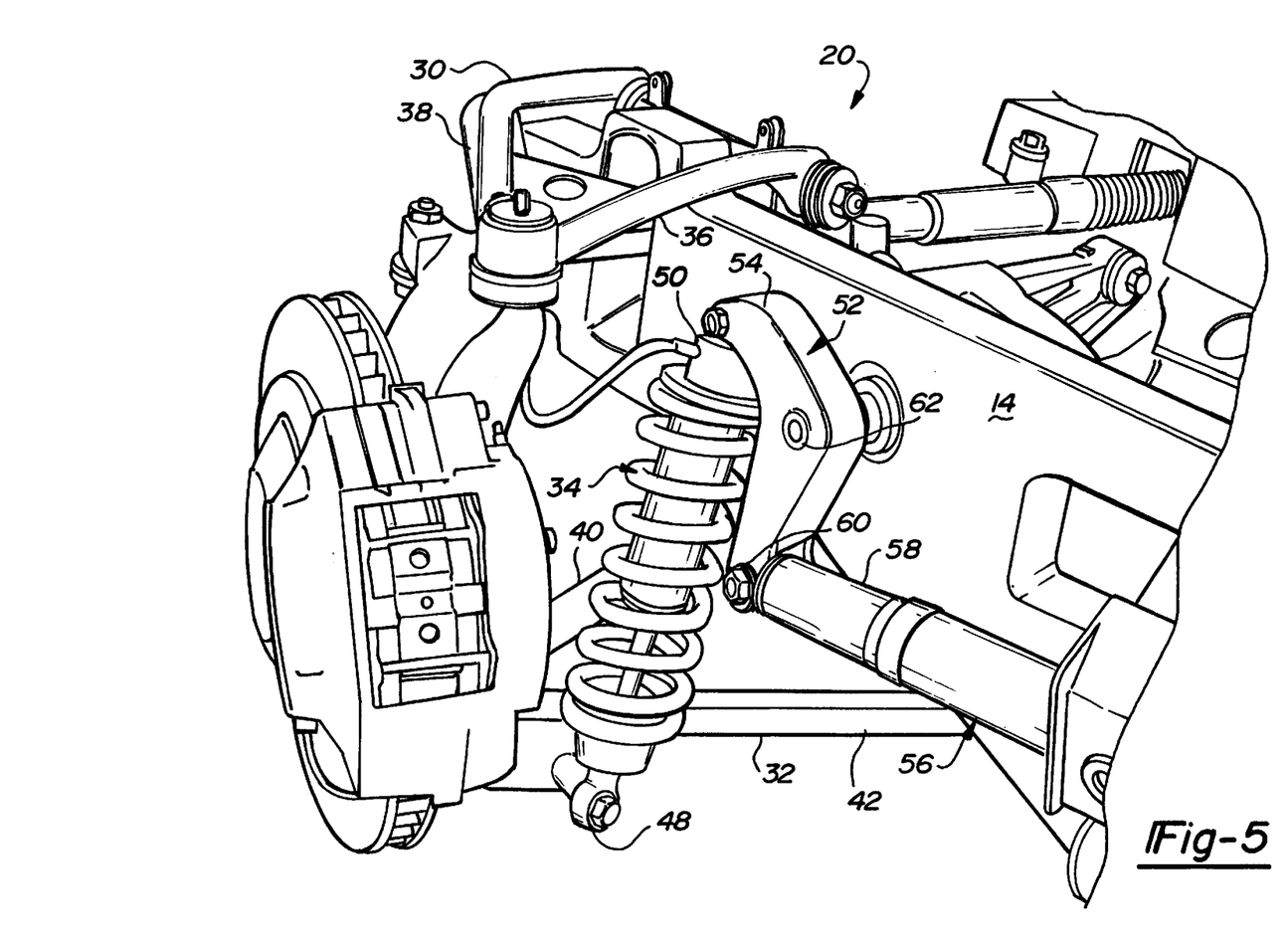
Figure 6:
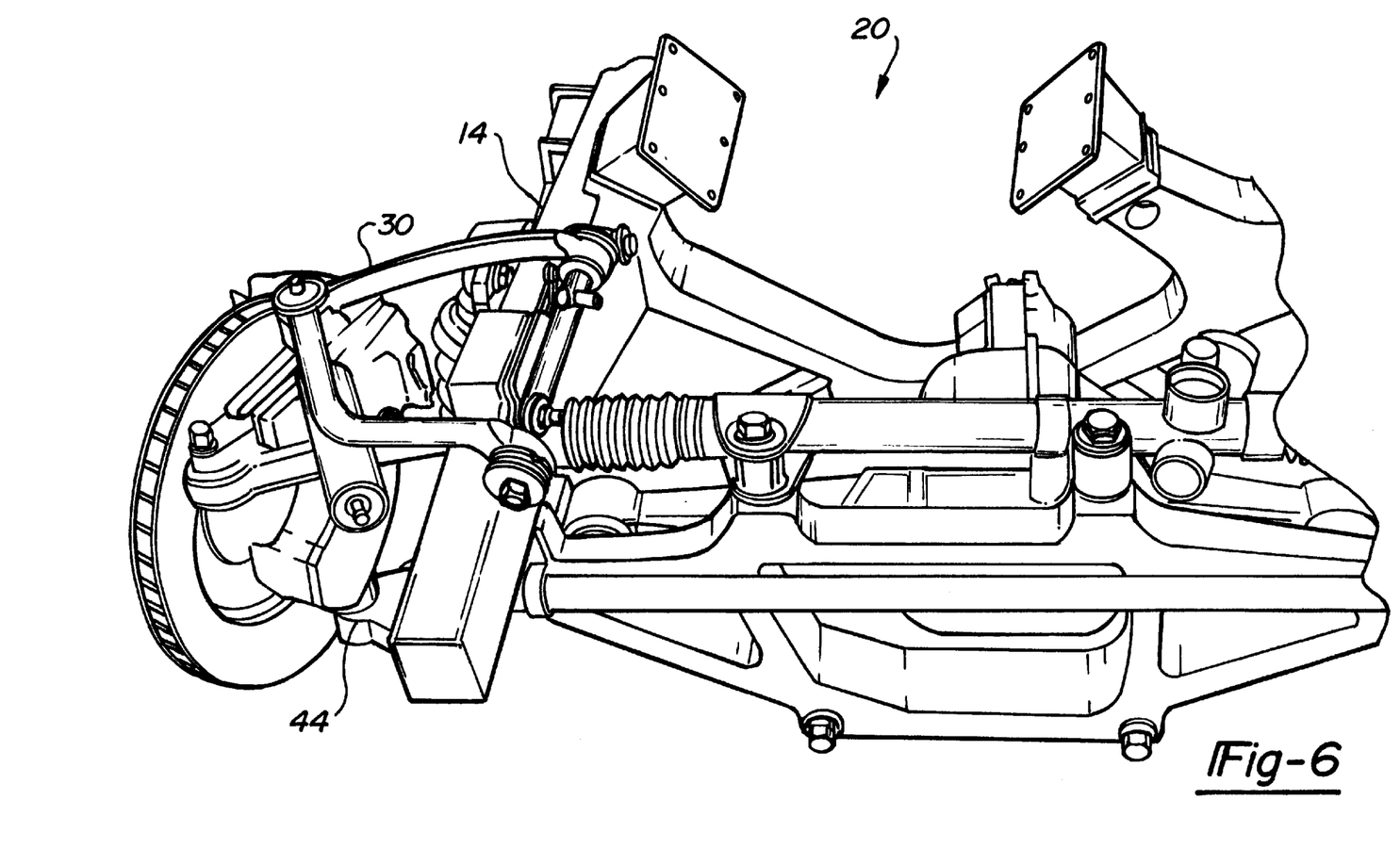
Figure 7:
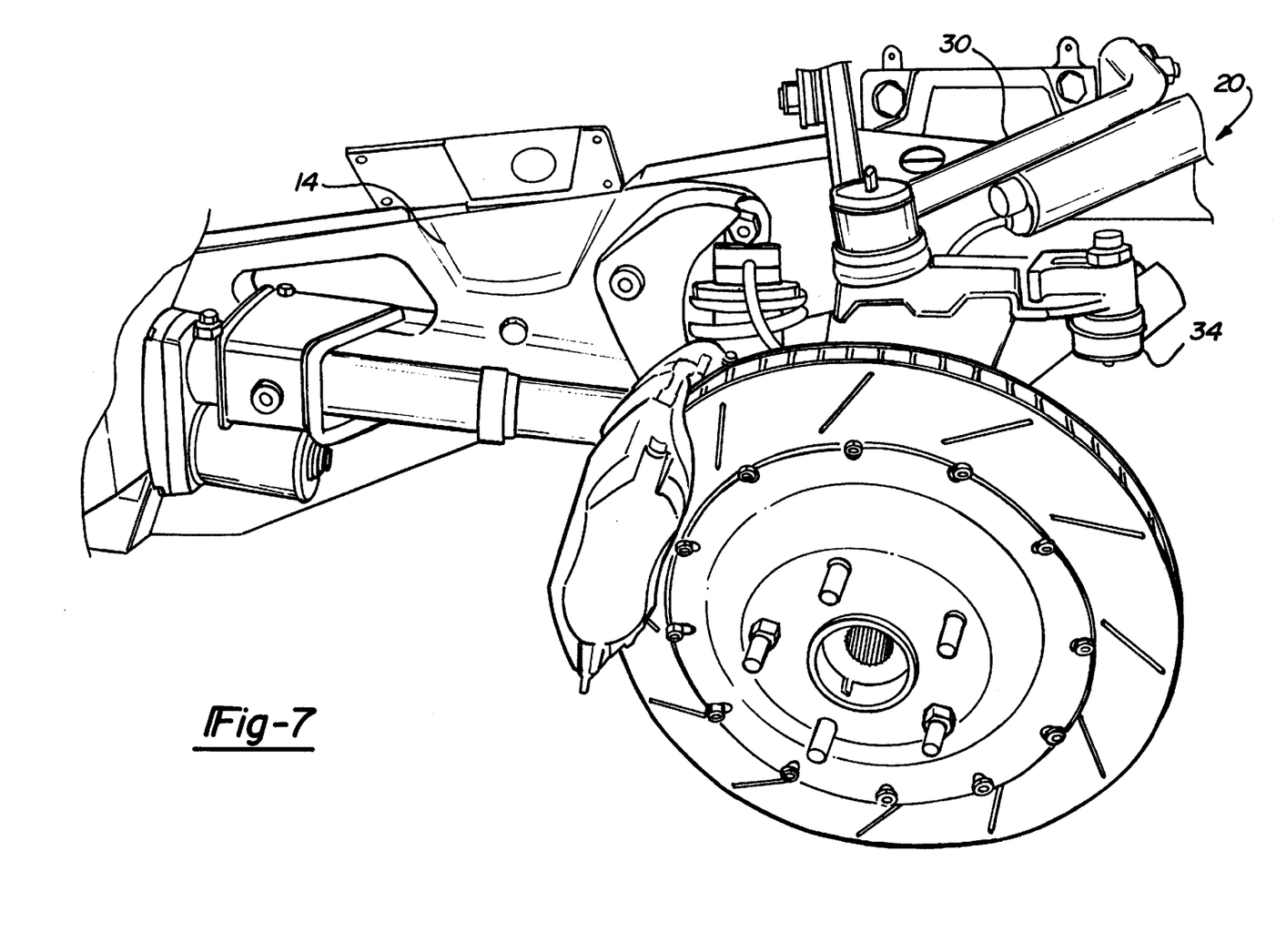
Figure 8:
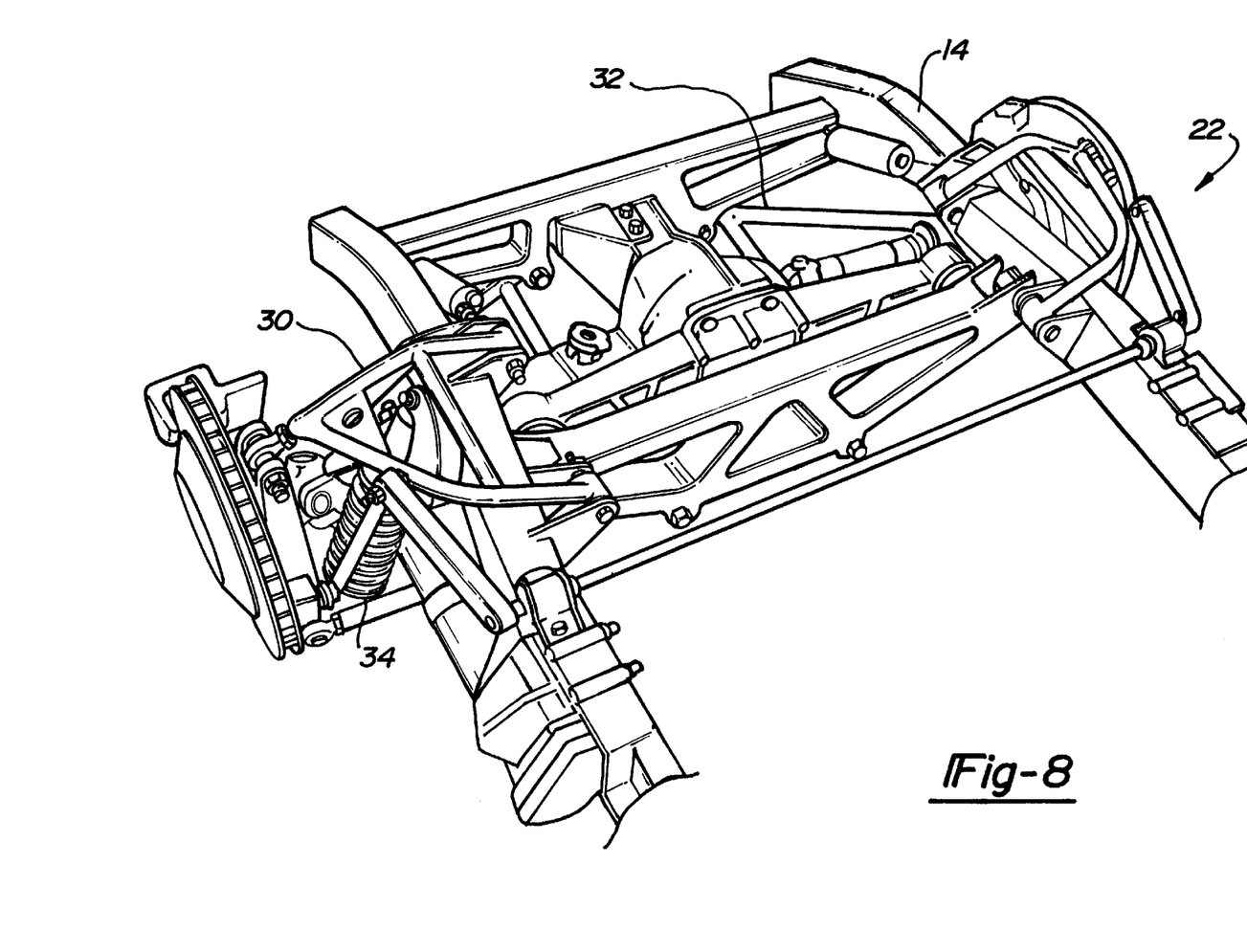
FIG. 8 is a top perspective view of the rear end module of the adjustable suspension system of FIG. 1.
Figure 9:
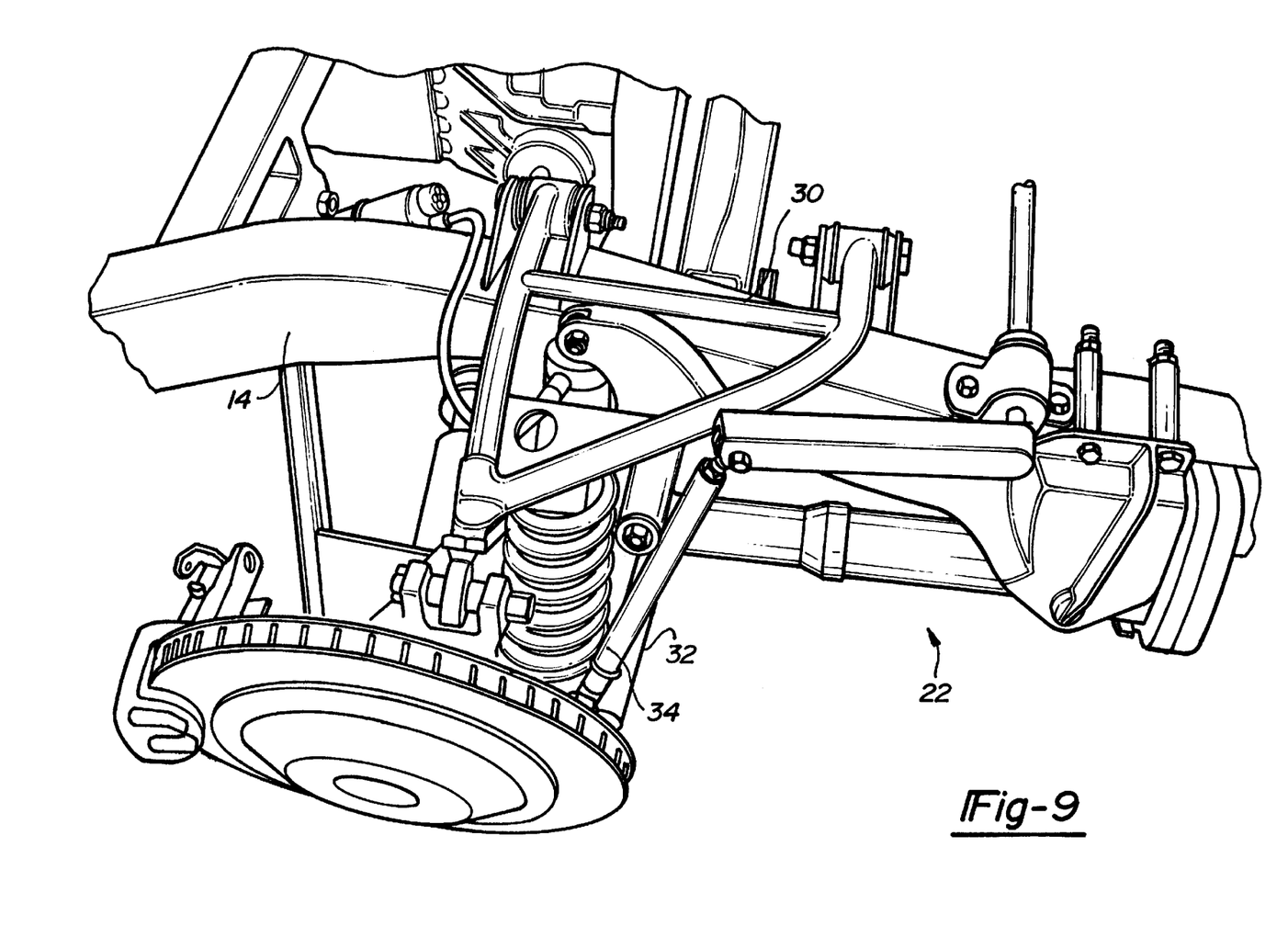
FIGS. 9–13 are enlarged views of portions of the rear end module of FIG. 8.
Figure 10:
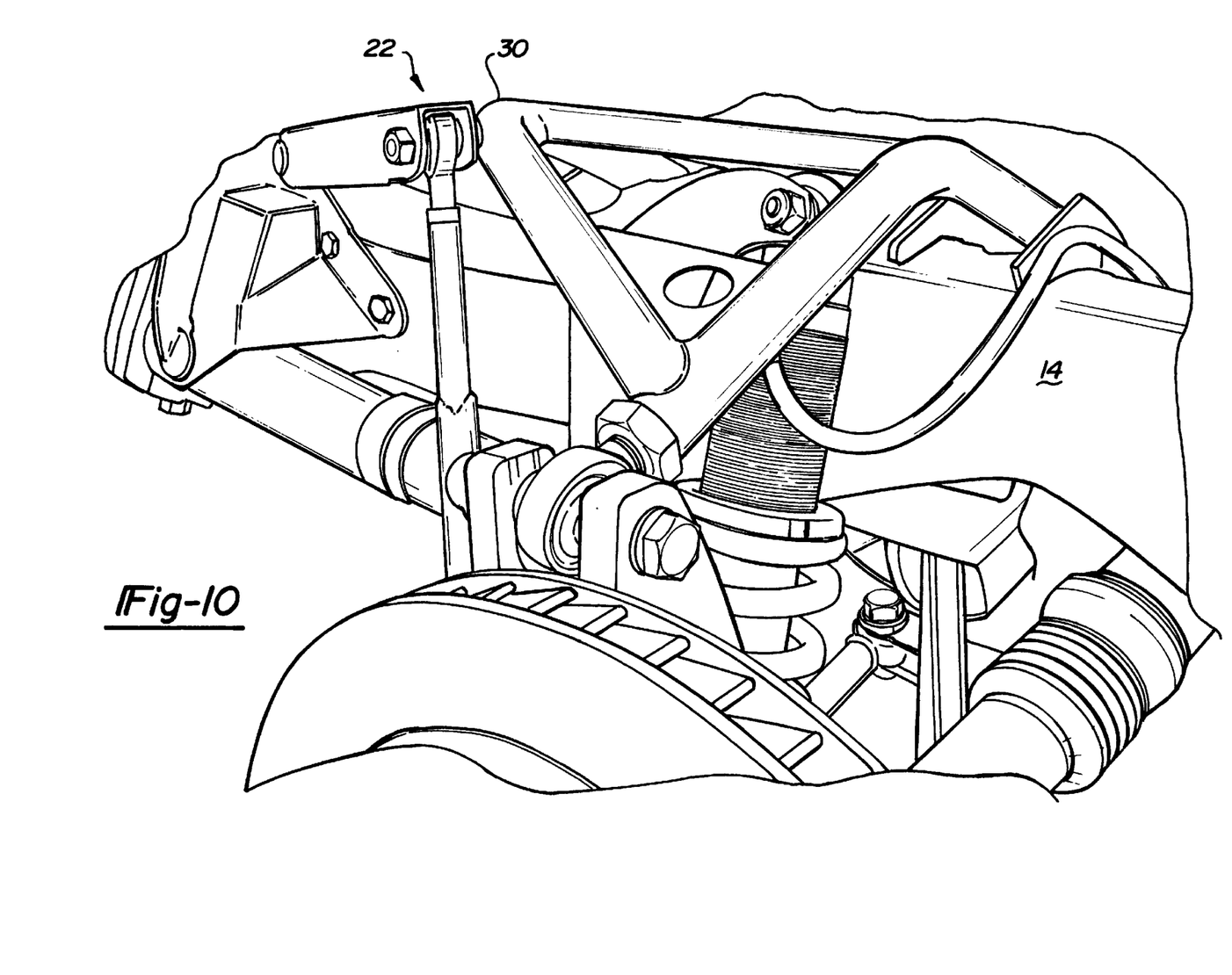
Figure 11:
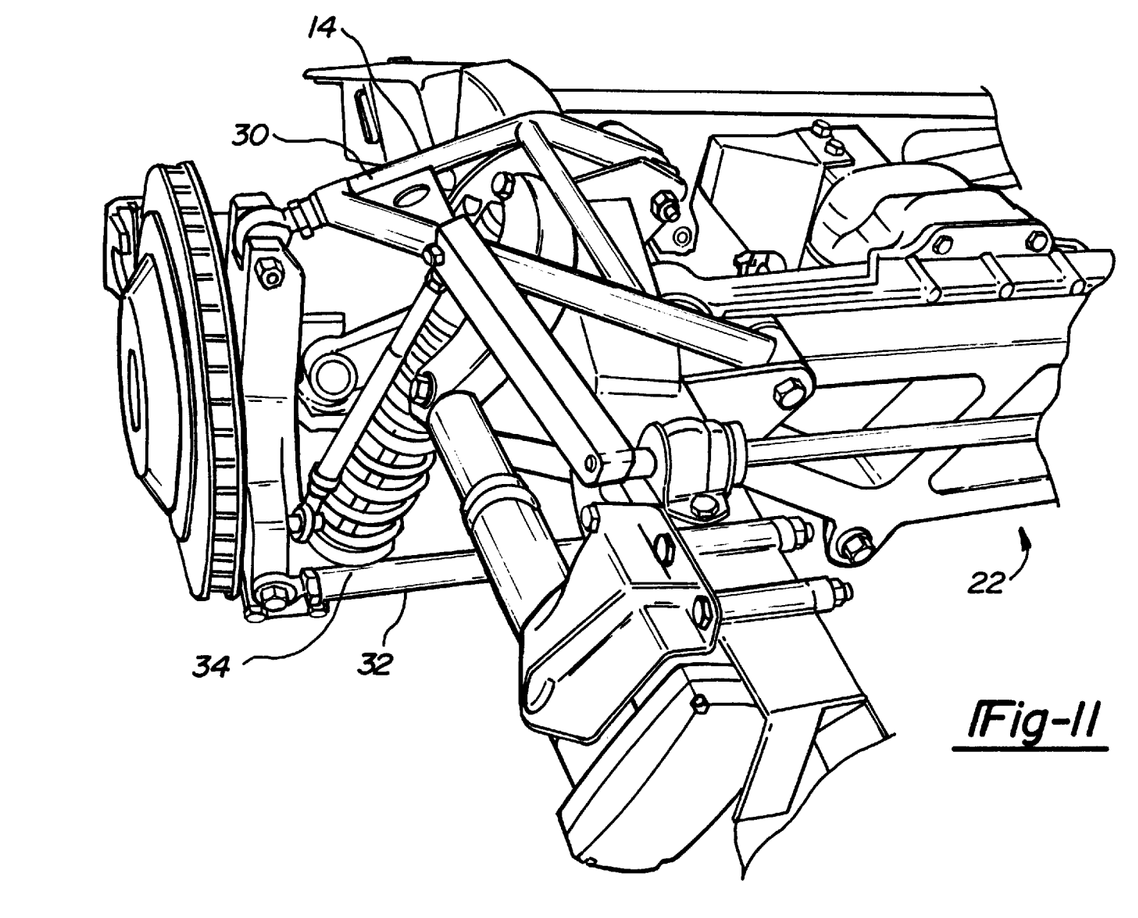
Figure 12:
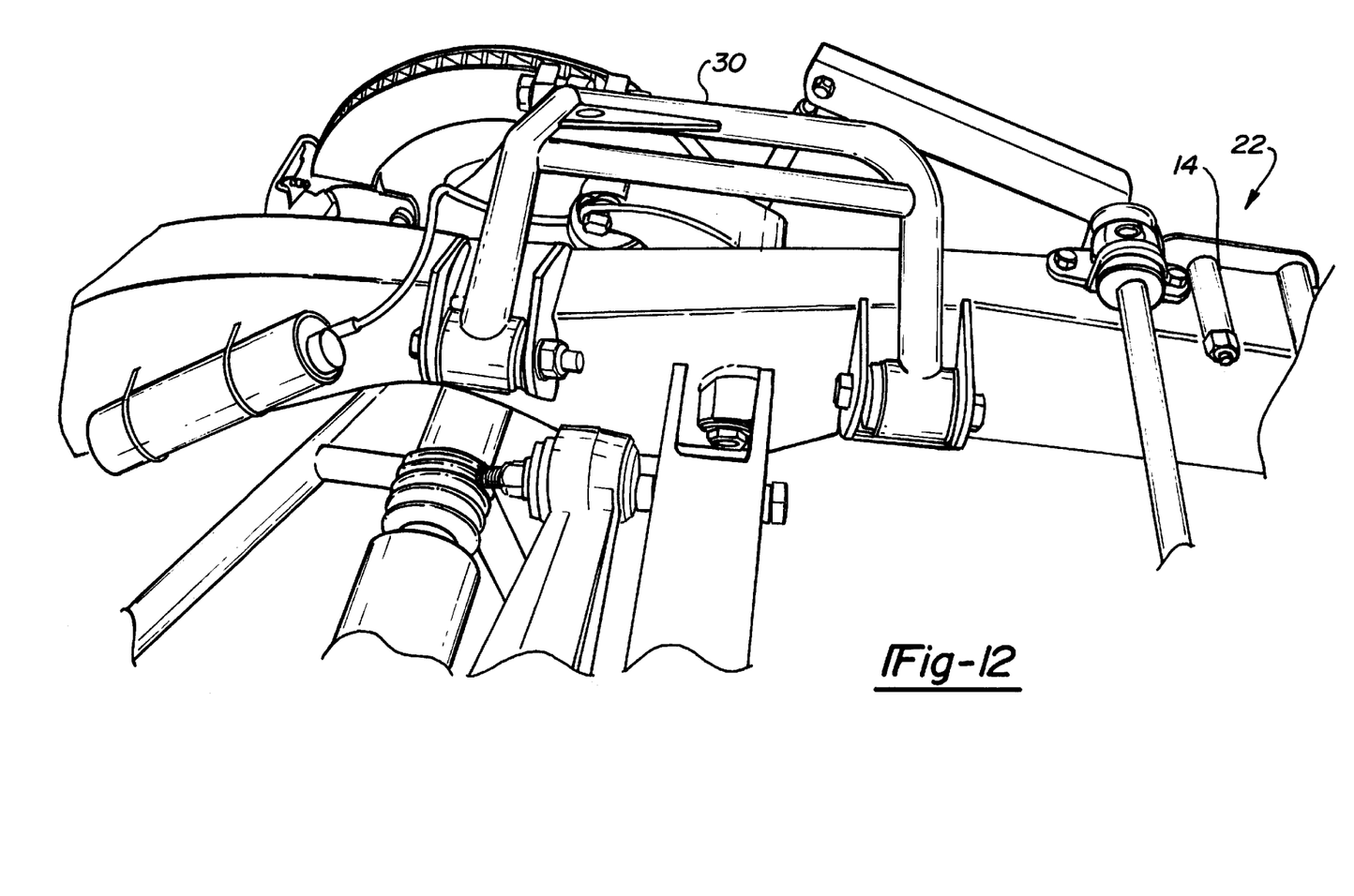
Figure 13:
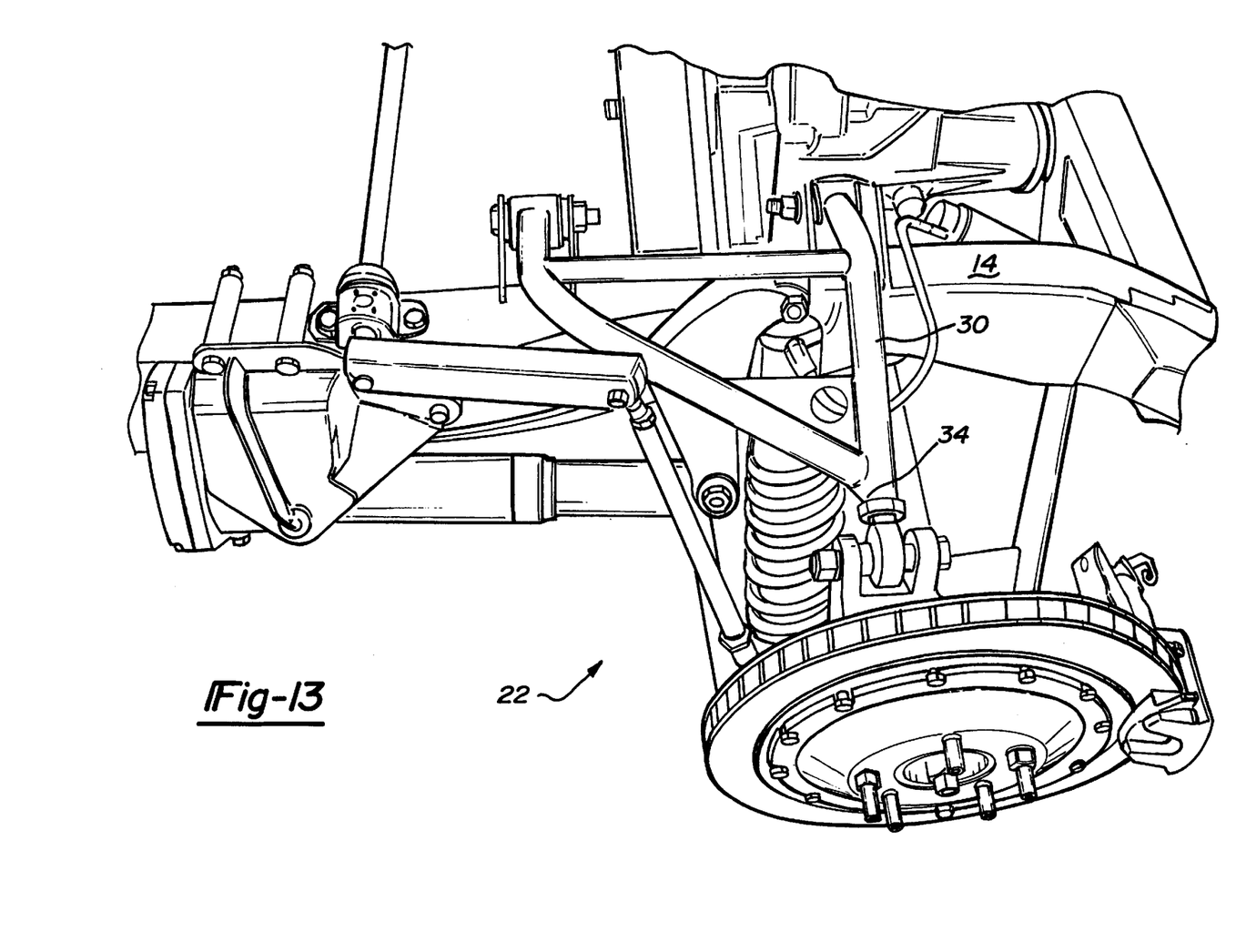

As shown specifically in FIG. 5, when the first mode in which the lower ride height of the motor vehicle 12 is desired, the drive unit 56 is actuated to extend the linear actuator 58 and thereby rotate the connector member 52 clockwise about its pivot axis 62. In turn, the shock absorber 34 is upwardly displaced and the upper and lower control arms 30 and 32 are upwardly displaced. Conversely, when it is desired to select the second drive mode in which the vehicle drive height is significantly greater, the drive unit 56 is operated to retract the linear actuator 58 and thereby rotate the connector member 52 in a counterclockwise direction. Such rotation downwardly displaces the upper end 50 of the shock absorber 34 and in turn downwardly rotates both of the upper and lower control arms 30 and 32. This adjustment maintains the full operational range of the shock absorber 34.

With continued reference to FIG. 1 and additional reference to FIGS. 8–13, the rear end module 22 of the adjustable suspension system 10 is shown. The rear end module 22 of the adjustable suspension 10 is in large part identical to the front end module 20. As such, the structure and operation of the rear end module 22 need not be described in detail. The reference numerals applied in FIGS. 8–13 common to those used to describe the front end module 20 are used to identify substantially similar elements. As with the front end module 20, the rear end module 22 is a substantial mere image about a longitudinal centerline.

In one particular application, the adjustable suspension 10 of the present invention is operable in the first mode or on-road mode to provide a 5.75" vehicle ride height or ground clearance. In this particular application, the adjustable suspension system 10 is operative in the second mode or off-road mode to provide a 9.75" vehicle ride height or ground clearance. In both modes, the adjustable suspension system 10 maintains a range of ten inches of total vertical travel. It will be understood that these particular dimensions are susceptible to modification for any of a number of various applications.

In the exemplary embodiment, the adjustable suspension system 10 of the present invention is controlled by a switch (not shown) located in the passenger compartment of the motor vehicle 12. The switch preferably simultaneously controls four drive units 56 associated with each of the wheels. Alternatively, it will be understood that the front pair of wheels 16 and the rear pair of wheels 18 may be independently adjustable if desired.

Thus, the adjustable suspension system 10 of the present invention provides for optimum roll centers, camber curves and toe curves throughout a full range of total vertical travel.

While the above description constitutes the preferred embodiment of the invention, it will be appreciated that the invention is susceptible to modification, variation, and change without departing from the proper scope or fair meaning of the accompanying claims.

We claim:

1. An adjustable suspension for a motor vehicle having a frame and front and rear pairs of wheels, the adjustable suspension comprising:

a first control arm pivotally interconnecting a wheel of the front and rear pairs of wheels to the frame;

a second control arm pivotally interconnecting said wheel to the frame, wherein said first and second control arms have different lengths such that said first and second control arms maintain proper camber of said wheel throughout a suspension adjustment; and a shock absorber having a first end fixedly interconnected to said second control arm and a second end adjustably interconnected to the frame;

whereby the adjustable suspension is selectively operable in a first mode to provide a first ride height and a second mode to provide a second ride height, said second ride height being substantially greater than said first ride height.

2. The adjustable suspension for a motor vehicle of claim 1, wherein said first and second control arms are pivotally attached to the frame.

3. The adjustable suspension for a motor vehicle of claim 2, wherein said second control arm is substantially longer than said first control arm.

4. The adjustable suspension for a motor vehicle of claim 3, wherein said first control arm is an upper control arm and said second control arm is a lower control arm.

5. The adjustable suspension for a motor vehicle of claim 1, wherein said second end of said shock absorber is in a first position when the adjustable suspension is in said first mode and said second end of said shock absorber is in a second position when the adjustable suspension is in said second mode.

6. The adjustable suspension for a motor vehicle of claim 5, further comprising a connector member pivotally attached to the frame, the connector member including a first end attached to said second end of said shock absorber.

7. The adjustable suspension of a motor vehicle of claim 1, wherein said first control arm is an upper control arm, said second control arm is a lower control arm and said lower control arm is substantially longer than said upper control arm.

8. An adjustable suspension for a motor vehicle having a frame and front and rear pairs of wheels, the adjustable suspension comprising a first control arm pivotally interconnecting a wheel of the front and rear pairs of wheels to the frame, the adjustable suspension comprising:

a first control arm interconnecting said wheel to the frame;

a second control arm interconnecting said wheel to the frame, wherein said first and second control arms have different lengths such that said first and second control arms maintain proper camber of said wheel throughout a suspension adjustment;

a shock absorber having a first end and a second end, said first end fixedly interconnected to said second control arm; and means for adjustably interconnecting said second end of said shock absorber to the frame between a first position and a second position such that the adjustable suspension is in a first mode and provides a first vehicle ride height when the shock absorber is in said first position and the adjustable suspension is in a second mode and provides a second vehicle ride height when the shock absorber is in the second position.

9. The adjustable suspension for a motor vehicle of claim 8, wherein said means for adjustably interconnecting said second end of said shock absorber and the frame includes a connector member pivotally attached to the frame.

10. The adjustable suspension for a motor vehicle of claim 9, further comprising a drive unit, and wherein said connector member includes a first end attached to said second end of said shock absorber and a second end connected to said drive unit.

11. The adjustable suspension for a motor vehicle of claim 10, wherein said drive unit includes a linear actuator attached to said second end of said connector member.

12. The adjustable suspension for a motor vehicle of claim 11, wherein said linear actuator is pivotally attached to said second end of said connector member and movable between an extended position when the adjustable suspension is in the first mode and a retracted position when the adjustable suspension is in the second mode.

13. The adjustable suspension for a motor vehicle of claim 8, wherein said first control arm is an upper control arm and said second control arm is a lower control arm.

14. The adjustable suspension of a motor vehicle of claim 8, wherein said first control arm is an upper control arm, said second control arm is a lower control arm and said lower control arm is substantially longer than said upper control arm.

15. An adjustable suspension for a motor vehicle having a frame and front and rear pairs of wheels, the adjustable suspension comprising:

an upper control arm pivotally interconnecting a wheel of the front and rear pairs of wheels to the frame;

a lower control arm pivotally interconnecting said wheel to the frame, wherein said upper and lower control arms have different lengths such that said upper and lower control arms maintain proper camber of said wheel during a suspension adjustment;

a shock absorber having a first end and a second end, said first end fixedly interconnected to said lower control arm; and a connector member pivotally attached to the frame, the connector member including a first end attached to said second end of said shock absorber;

the adjustable suspension selectively operable in a first mode to provide a first vehicle ride height and a second mode to provide a second vehicle ride height, said second vehicle ride height being substantially greater than said first vehicle ride height.

16. The adjustable suspension for a motor vehicle of claim 15, wherein said upper and lower control arms are pivotally attached to the frame.

17. The adjustable suspension for a motor vehicle of claim 15, wherein said second end of said shock absorber is in a first position when the adjustable suspension is in said first mode and said second end of said shock absorber is in a second position when the adjustable suspension is in said second mode.

18. The adjustable suspension for a motor vehicle of claim 15, further comprising a drive unit operably interconnected to said connector member for pivoting said connector member about a pivot axis to thereby move said second end of said shock absorber between said first and second positions.

19. The adjustable suspension for a motor vehicle of claim 18, wherein said connector member includes a second end and further wherein said drive unit includes a linear actuator attached to said second end of said connector member.

20. The adjustable suspension for a motor vehicle of claim 19, wherein said linear actuator is movable between an extended position when the adjustable suspension is in the first mode and a retracted position when the adjustable suspension is in the second mode.

21. The adjustable suspension of a motor vehicle of claim 15, wherein lower control arm is substantially longer than said upper control arm.

* * * * *